United States Patent
Leterrier et al.

(10) Patent No.: US 11,273,771 B2
(45) Date of Patent: Mar. 15, 2022

(54) REAR HATCHBACK WITH STRUCTURAL LINER EQUIPPED WITH A HATCH

(71) Applicant: COMPAGNIE PLASTIC OMNIUM, Sainte-Julie (FR)

(72) Inventors: Franck Leterrier, Sainte-Julie (FR); Pascal Barbier, Sainte-Julie (FR); Philippe Coudron, Sainte-Julie (FR)

(73) Assignee: COMPAGNIE PLASTIC OMNIUM, Lyons (FR)

( * ) Notice: Subject to any disclaimer, the term of this patent is extended or adjusted under 35 U.S.C. 154(b) by 92 days.

(21) Appl. No.: 16/728,902

(22) Filed: Dec. 27, 2019

(65) Prior Publication Data
US 2020/0207286 A1 Jul. 2, 2020

(51) Int. Cl.
*B60R 13/02* (2006.01)
*B60J 5/10* (2006.01)

(52) U.S. Cl.
CPC .......... *B60R 13/0243* (2013.01); *B60J 5/107* (2013.01)

(58) Field of Classification Search
CPC ............................ B60R 13/0243; B60J 5/107
See application file for complete search history.

(56) References Cited

U.S. PATENT DOCUMENTS

2013/0001982 A1* 1/2013 Ohba ............... B60R 13/04
296/187.11

FOREIGN PATENT DOCUMENTS

| DE | 3609413 A1 | 10/1987 |
| DE | 10 2010 053 355 A1 | 7/2011 |
| JP | 2002-225565 A | 8/2002 |
| JP | 2007-210553 A | 8/2007 |
| JP | 2016-084106 A | 5/2016 |
| KR | 101922167 B1 | 11/2018 |
| WO | 2010/125299 A1 | 11/2010 |

* cited by examiner

*Primary Examiner* — D Glenn Dayoan
*Assistant Examiner* — Melissa Ann Bonifazi
(74) *Attorney, Agent, or Firm* — Dinsmore & Shohl LLP

(57) ABSTRACT

Structural liner (20) of a motor vehicle hatchback (10) having an outer face (22) oriented towards the outside of the vehicle and an inner face (24) oriented towards the inside of the vehicle when the hatchback (10)) is assembled on the latter, and at least one groove (23) borne by one of the two faces (22, 24), the groove (23) forming a zone of mechanical weakness able to facilitate the execution of an opening (28) within the structural liner (20).

17 Claims, 6 Drawing Sheets

REAR HATCHBACK WITH STRUCTURAL LINER EQUIPPED WITH A HATCH

CROSS REFERENCE TO RELATED APPLICATION

This application claims priority to French Application No. 1874247 filed Dec. 27, 2018, the entire disclosure of which is hereby incorporated by reference.

DESCRIPTION

The invention relates to plastic motor vehicle hatchbacks.

Usually, motor vehicle hatchbacks comprise a structural part, generally called a liner, which is located between an outer skin, intended to constitute the visible outer face of the bodywork part, and an interior trim, which is an interior lining part which, in general, completely covers the unsightly parts of the structural liner that would otherwise be visible from inside the vehicle. Often, this applied trim specifically covers a lower part of the structural liner, located below the rear window of the hatchback. This trim therefore contributes to the quality perceived by the user, so it must therefore have a clean look.

On the passenger compartment side of the liner and below the rear window, the hatchback generally integrates a set of technical equipment such as a hatchback-closing assistance motor, electrical harnesses, a locking motor, computers. These technical elements are generally fastened on the face of the structural liner of the hatchback which is facing the passenger compartment of the vehicle. Thus, they are located and fastened on the liner and on the trim covering the liner, and thus hidden inside the tailgate. If any of these technical elements fails, it is accessed by disassembling the trim of the structural liner, replaced, then the trim is reassembled on the structural liner. This procedure is a simple way to replace a faulty technical component.

This type of hatchback, although very satisfactory, has the disadvantage of having several distinct parts, including the trim, the structural liner and the outer skin. Thus, during the assembly of the hatchback, several assembly steps are necessary, which increase the cost of manufacturing thereof. It should also be noted that the handling of a large trim is complicated for the operators on the production line, which increases the risk of impacts that can damage the hatchback during assembly. Similarly, these assembly steps require that there be suitable equipment on the production line. In addition, ease of access to a failing technical component that needs to be replaced, is a rarely used feature, since these components are designed to not fail during the lifespan and normal use of the vehicle (for example, the locking motor, the electrical harness supplying the license plate lamp, etc.).

Furthermore, the addition of parts increases the weight of the hatchback, which hinders the performance of the vehicle and increases its energy consumption.

Hatchbacks are known in which the function of the trim is achieved in part or entirely by the structural liner. In these, the technical elements are fastened on the outer face of the structural liner facing the visible skin of the hatchback. An outer face is the face of the structural liner which is oriented towards the outside of the vehicle when the hatchback is mounted on a vehicle, in the closed position. Thus, part or all of the inner face, opposite to the outer face and visible from the passenger compartment or when the hatchback is open, serves as a trim, which is therefore partially or totally absent from the hatchback. These hatchbacks overcome the aforementioned drawbacks. However, in these hatchbacks, access to the technical elements is then no longer possible once the tailgate is assembled, because they are enclosed between the structural liner and the skin, usually assembled by a bonding that is very difficult to disassemble, and then reassemble. Thus, when a technical element is defective, its replacement requires either disassembly of the skin by debonding the liner of the hatchback, or completely replacing the hatchback, which is extremely expensive or difficult in both cases.

It is therefore desired to provide a hatchback liner with partially or fully integrated trim allowing the replacement of one or more technical elements of the hatchback without having to disassemble or replace it.

For this purpose, the aim of the invention is a structural liner made of a plastic material for a motor vehicle hatchback which has an outer face oriented towards the outside of the vehicle and an inner face oriented towards the inside of the vehicle when the hatchback is assembled on the latter, and at least one groove borne by one of the two faces, the groove forming a zone of mechanical weakness able to facilitate the execution of an opening within the structural liner.

Thus, when it is desired to replace a defective technical element, a pre-identified part of the structural liner of the hatchback is cut out in order to have access to the technical element in question. Thus, there is easy access to the technical element without having to disassemble the structural liner and the skin of the hatchback. It is therefore possible to change the technical element more quickly and at a lower cost than with known hatchbacks, having a structural liner with integrated trim.

The groove forms a zone of mechanical weakness that allows and facilitates the cutting out of the structural liner. In addition, the groove makes possible the guidance of the cut-out along a defined and precise contour, which avoids damage to technical elements or wiring that would be located just behind on the outer face of the structural liner. The precision of the cut-out also makes it easy to replace the cut part, or its replacement, in a manner that is easy and aesthetically compatible with the fact that the structural liner is visible from the passenger compartment of the vehicle.

Lastly, the fact that the groove is located on the face of the structural liner which is facing the external skin of the hatchback makes the groove invisible on the face opposite to the first face mentioned. This arrangement makes the groove inconspicuous, or invisible, to a user of the vehicle.

The structural liner according to the invention may also comprise one or more of the following characteristics, taken alone or in combination:
- the groove forms a contour delineating an access hatch;
- the outer face comprises means for fastening technical elements located inside the closed contour delineating the access hatch;
- the outer face comprises at least one retaining means arranged near the groove outside of the closed contour;
- the access hatch comprises at least one fastening means;
- the fastening means of the access door is located facing the retaining means arranged near the groove outside of the closed contour;
- part of the groove is a film hinge allowing the rotation of the hatch when the opening of the structural liner has been made;
- the fastening means of the access hatch is suitable to receive a clasp able to cooperate with the retaining means arranged near the groove outside of the closed contour;

the access hatch fastening means is facing the retaining means arranged near the groove outside of the closed contour when the access hatch rotates about an axis normal to the outer face.

The invention also relates to a replacement hatch for an opening in a structural liner for a motor vehicle hatchback which comprises at least one clip able to cooperate with a retaining means arranged near an opening of the structural liner.

The replacement hatch may comprise a technical face intended to be concealed when the replacement hatch is mounted on the opening in the structural liner, the technical face comprising at least one technical fastening means element The replacement hatch may advantageously be larger than the opening in the structural liner for which the replacement door is intended.

The invention also relates to a plastic hatchback of a motor vehicle comprising a structural liner according to the invention.

The invention also relates to a method of replacing a technical element fastened on a structural liner of a motor vehicle hatchback which comprises the steps of:
  cutting out an access hatch in the structural liner of the hatchback following a groove of the structural liner;
  clearing of an opening in the structural liner left by the cut-out of the access hatch;
  replacement of the technical element with a replacement technical element; and
  closing of the opening.

Advantageously, the step of closing the opening can be performed by clipping on a replacement hatch.

Advantageously, the method according to the invention may comprise the following characteristics:
  the step of cutting out the access hatch leaves a portion of the groove intact, forming a film hinge of the structural liner;
  the step of clearing the access hatch is performed by rotating the hatch around the film hinge;
  the closing step is performed by folding back the access hatch into the opening.

Advantageously, the method according to the invention may comprise the following characteristics:
  the step of clearing the access hatch is carried out by completely removing it;
  the closing step is performed by again placing the access hatch in the opening, by having it rotate about an axis thereof, preferably a rotation of 180 degrees about the axis.

BRIEF DESCRIPTION OF THE FIGURES

In what follows, terms such as "longitudinal X axis", "transverse Y axis", "vertical Z axis", "front", "rear", "above", "upper", "below", "lower", etc. are understood by reference to the usual orientation of motor vehicles according to the marks shown in the figures.

The invention will be better understood on reading the description which follows, given solely by way of example and with reference to the appended drawings in which:

FIGS. 5a and b is a section of a structural liner according to a first embodiment of the invention along plane B-B of FIG. 4;

FIGS. 6a and b is a section of a structural liner according to a second embodiment of the invention along plane B-B of FIG. 4;

FIGS. 7a and b is a section of a structural liner according to a first embodiment of the invention along plane B-B of FIG. 4;

DETAILED DESCRIPTION

Referring now to FIGS. 1, 2, 3 and 4 which show a hatchback 10 of a motor vehicle having a structural liner 20 according to the invention.

Hatchback 10 comprises a structural liner 20. A structural liner is a liner which provides the mechanical strength of the hatchback, supports the other elements thereof which are fastened on it and connects the hatchback to the vehicle body by hinges.

Figure 3:
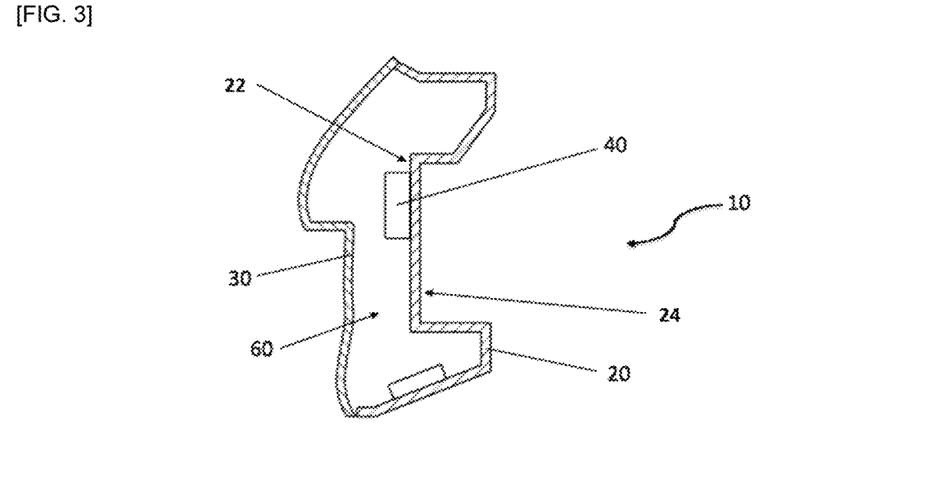
FIG. 3 is a section of a motor vehicle hatchback comprising a structural liner according to the invention along plane A-A of FIG. 2.

The structural liner 20 has interface areas able to receive a skin 30 of the tailgate 10, as well as a receiving opening for a rear window. It comprises an outer face 22 intended to be facing the outer skin 30. An outer face 22 is the face of the structural liner 20 which is oriented towards the outside of the vehicle when the hatchback 10 is assembled thereon, in the closed position. This outer face 22 accommodates, as we will see later, fastening means 26 for technical elements. It also has an inner face 24 which is opposite to the outer face 22. As can be seen in FIG. 3, which is a section of the lower part of the hatchback 10, the visible skin 30 and the structural liner 20 form a hollow body 60 between them, once assembled.

The outer face 22 of the structural liner 20 comprises fastening means 26. Thus, these fastening means 26 are located in the hollow body 60. They are therefore not visible outside this hollow body 60. Similarly, they are not accessible when the visible skin 30 is assembled on the hatchback. These fastening means 26 are able to fasten technical elements of any kind on the outer face 22 of the structural liner 20.

Figure 1:
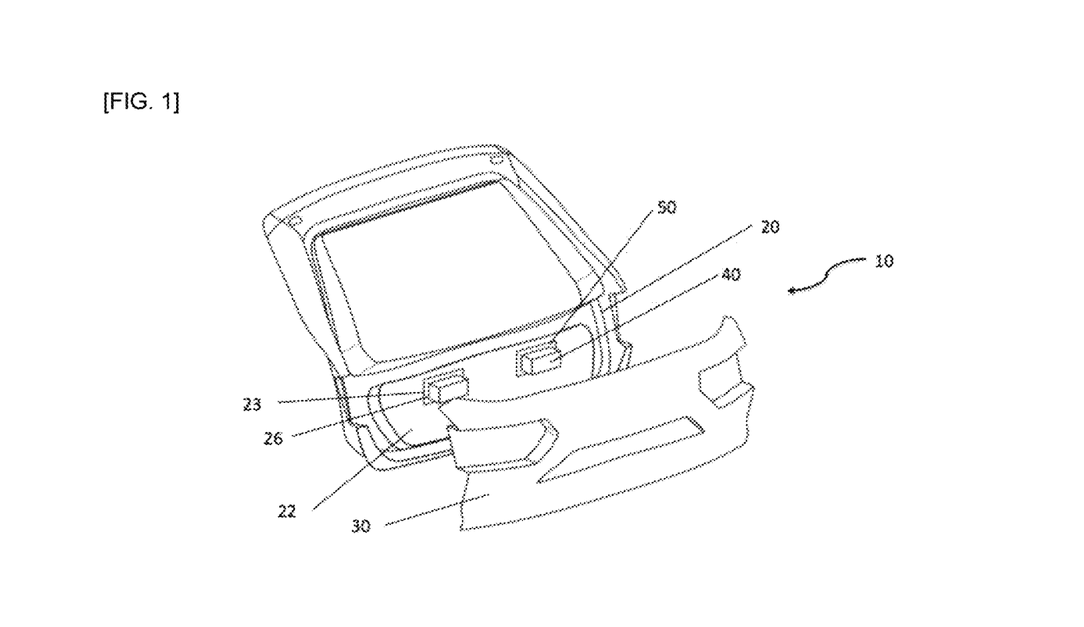
FIG. 1 is an exploded perspective view of a hatchback portion having a structural liner according to the invention.
Figure 2:
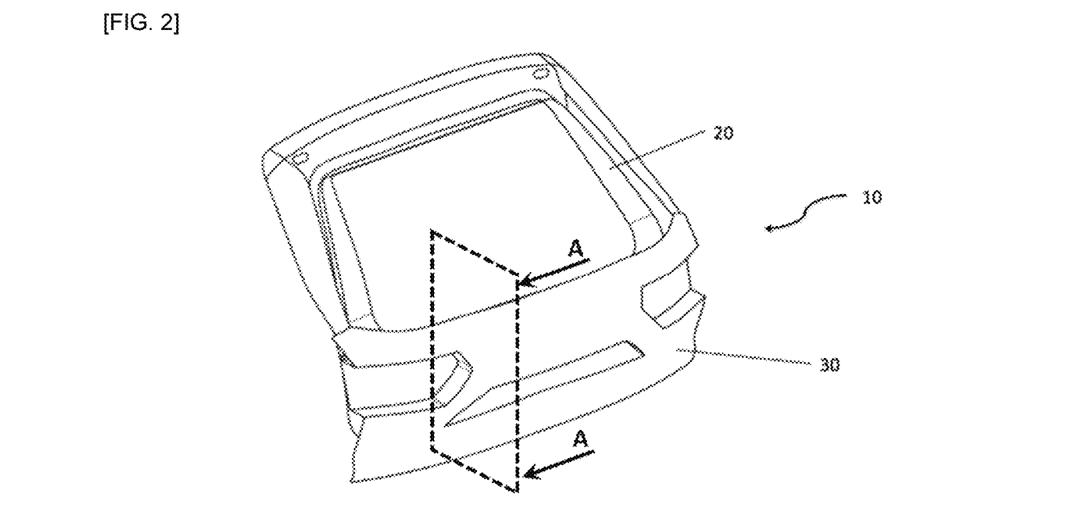
FIG. 2 is a perspective view of a hatchback portion comprising a structural liner according to the invention.
Figure 4:
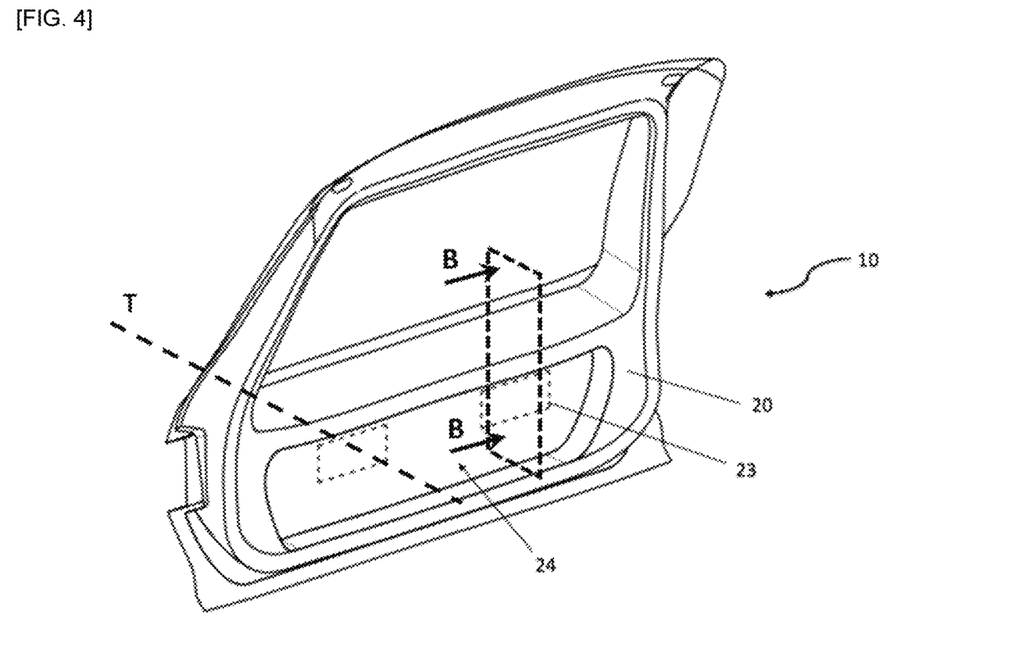
FIG. 4 is a view of an inner face of a structural hatch liner according to the invention.

One of the outer 22 or inner 24 faces of the structural liner 20 has a groove 23 running along it. This groove 23 is shown in FIG. 1. The dotted lines of FIG. 4 represent, for example, the location of the groove 23 on the inside face 22 of the structural liner 20 which is not visible thereon. The positioning of this groove 23 is such that it locally decreases the thickness of the structural liner 20. The groove is not fully cut through. Thus, and advantageously, it is not visible on the inner face 24. Thus, when the structural liner 20 is assembled on the hatchback 10, the groove 23, located within the hollow body 60, is invisible.

The groove 23 delineates an area of mechanical weakness which is able to facilitate the execution of an opening 28 within the structural liner 20. This opening 28 can be made by cutting, using a cutting tool, such as a tapered blade, a small diameter milling machine, a heated tip. Any other cut-out means may be used. The cut-out of the structural liner 20 is greatly facilitated by the zone of mechanical weakness created by the groove 23. Thus, it is possible to cut out the structural liner 20 according to a contour by precisely following the groove 23 because the groove 23, although on the first face 22 which is invisible to the person performing the cut-out, mechanically guides the cut. In addition, the guidance provided by the cut-out prevents the same from being executed directly on technical elements, wiring, or any other elements to be avoided which may be placed on the outer face 22 of the structural liner 20. The precision of the cut-out also enables a replacement or a replacement of the cut-out portion, which is aesthetically compatible with the portion of the inner face 24 of the structural liner 20 visible from a passenger compartment of a vehicle on which the hatchback 10 is mounted.

When the structural liner 20 is mounted on a hatchback 10 of a motor vehicle, the presence of this zone of mechanical weakness allows the execution of an opening 28 in the liner by cutting out a portion, which provides access to the compartment 60 located between the structural liner 20 and outer skin 30. Thus, it is possible to replace the technical elements 40 or any other defective part located in the hollow body 60, without having to disassemble the visible skin 30 from the liner 20 or to replace the hatchback 10 entirely.

Advantageously, the inner face 24 of the structural liner 20 may comprise a slightly-raised edging which borders the path followed by the groove 23 on the outer face 22. In this way, the position of the groove 23 is indicated on the inner face 24, which is the one visible during cut-out, which makes it easier to cut out along this groove 23. In the same way, the inner face 24 may comprise the beginning of a groove facing the groove 23 of the outer face 22. This beginning makes it possible to begin the cut-out of the groove 23 by enabling the placement of the cut-out tool directly facing the groove 23 on the outer face 22.

Advantageously, the outer face may comprise a guidance rib located near the groove 23 and bordering it. This rib makes it possible to improve the guidance of the cut-out along the groove 23.

The groove 23 forms a contour delineating an access hatch 50. Thus, when cutting out the structural liner 20, there is an access hatch 50 which is either still secured and that can be pivoted to make the opening 28, or that can be completely removed from the structural liner 20.

The outer face 22 of the structural liner 20 comprises fastening means 26 for technical elements 40 which are located inside the closed contour delineating the access hatch 50. Thus, the technical elements 40 are fastened directly on the access hatch 50. This arrangement facilitates the replacement of the technical element 40 because, if the access hatch 50 is removed from the liner 20, it is possible to carry out the replacement in a comfortable position outside of the hatchback 10. Similarly, if the hatch 50 remains attached to the structural liner 20, it is still possible to carry out the replacement outside of the hollow body 60 of the hatchback 10.

Alternatively, the fastening means 26 of the technical elements 40 may be located on the outside face 22 of the liner 20, outside the closed contour delineated by the access hatch 50. In this alternative, the access hatch 50 serves only to create an opening 28 to access the technical elements 40, which are not fastened on the access hatch 50, in order to replace them.

The structural liner 20 advantageously comprises at least one retaining means 29 which is close to the groove, while still being outside the closed contour delineated by the groove 23. These retaining means 29 allow and facilitate the fastening of the access hatch 50 in the opening 28 once the replacement of the technical element 40 has been performed.

The hatch 50 also advantageously comprises a fastening means 53 of the access hatch 50. This means is therefore located in the closed contour delineating the access hatch 50, and on the outer face 22. This means facilitates the fastening of the hatch 50, in the same way as the retaining means 29 located outside the closed contour. Advantageously, these means 29, 53 can cooperate with each other in order to accomplish the closing of the hatch 50.

We will now describe the method of replacing a technical element 40 fastened on the structural liner 20 of the hatchback 10 of a motor vehicle. This replacement is done in four principal steps.

A first step is to cut out the access hatch 50 in the structural liner 20 of the hatchback 10. The cut-out is done following the contour which follows the groove 23 on the inner face 24, which guides the cut-out. This step of cutting out can be performed using a cutting tool, such as a tapered blade, a small diameter milling machine, a heated tip. Any other cut-out means may be used. This cut-out can be performed by following the entire path of the groove 23, until completely removing the access hatch 50, or even by leaving a liner 20 portion intact, leaving the hatch 50 integral with the rest of the structural liner 20.

A second step consists in clearing the opening 28 in the structural liner 20, either by completely removing the hatch 50 or by pivoting it.

A third step is to replace the defective technical element 40 with another.

The fourth step is to close the opening 28. This closure can be achieved by using a specific separately produced replacement hatch 52 in the opening 28 of the structural liner 20 or by fastening the hatch 50 which has been cut out in the structural liner 20.

Thus, the method according to the invention allows the quick and qualitative replacement of a technical element 40 which is placed between the structural liner 20 and the outer skin 30 of a vehicle hatchback 10 without disassembling said hatchback 10.

Figure 5:
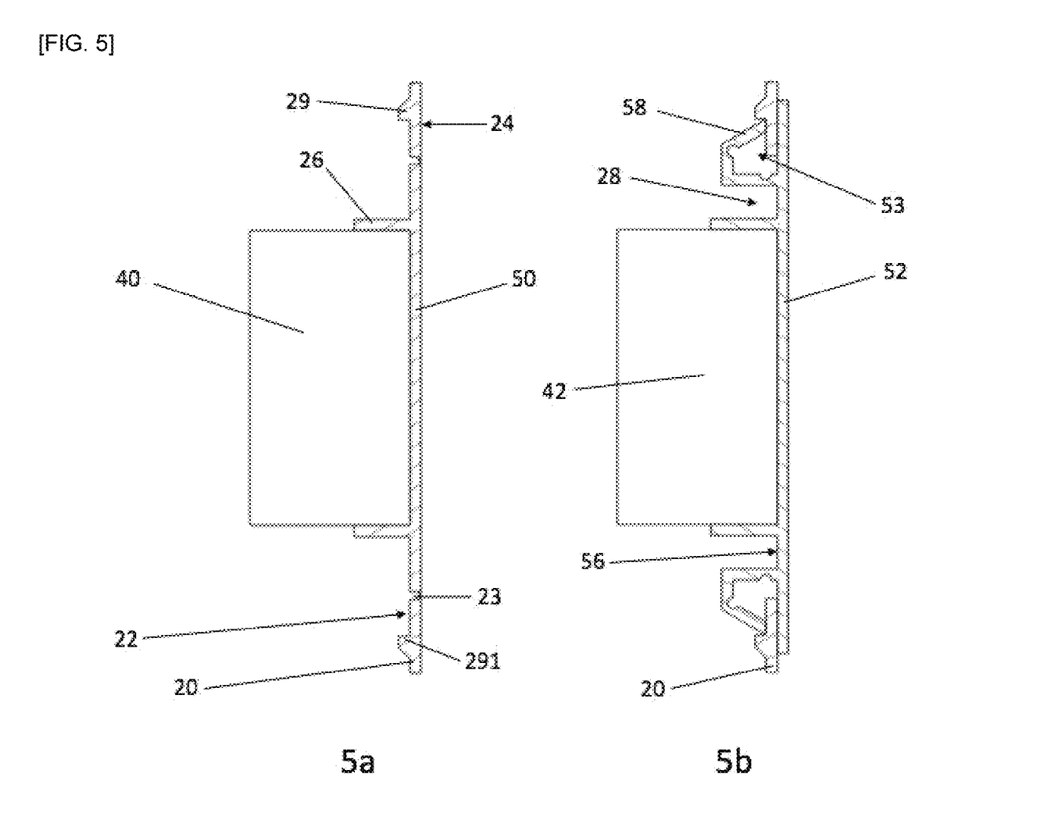

We will now describe a first embodiment of the invention using FIGS. 5a and 5b, which present a cross-section of the structural liner 20 along the plane B-B of FIG. 4. For this, we will only describe the elements added to the general description above.

The structural liner 20 according to the first embodiment of the invention, shown in FIG. 5a, comprises a groove 23 on one face which delineates a closed contour around a technical element 40 which is fastened using fastening means 26. Here, the fastening means 26 are an accommodation for the technical element 40 made directly by the structural liner 20. This accommodation is able to accommodate the technical element 40.

Alternatively, the technical element 40 may be located outside the closed contour and on the outer face 22. In this alternative, the fastening means 26 are located on the outer face 22, but outside the closed contour.

The structural liner 20 has, on its first face 22, retaining means 29 arranged outside the closed contour, near the groove 23. Here, these means are protuberances able to cooperate with clips of a cover hatch 52.

The groove 23, as previously, is able to guide the cut-out of a hatch 50 in the structural liner 20, in order to clear an opening 28.

In this embodiment, the hatch 50 is intended to be completely removed from the structural liner 20 and discarded, and is replaced by a new hatch, which will be called replacement hatch 52.

The invention also relates to a replacement hatch 52. This hatch cover 52 of the opening 28 of structural liner 20 has a technical face 56 which comprises at least one technical element fastening means 26. Here, the technical element fastening means is similar to that which the structural liner 20 had before it was cut out.

Alternatively, the replacement hatch 50 does not include a fastening means 26 of technical element 40, which can be located on the outer face 22, outside of the closed contour.

This technical face 56 of the hatch cover 52 comprises at least one clip 58, which is able to cooperate with the retaining means 29 intermittently bordering the opening 28 on the structural liner 20. The hatch cover 52 may have two clips 58, which are located on opposite edges thereof. Advantageously, it may comprise more clips 58, that is to say three, four, five or more.

Thus, this hatch cover 52 can be fastened in an extremely simple and rapid manner on the opening 28 of the structural liner 20. The cooperation of the clips 58 with the retaining means 29 allows a strong attachment of the hatch cover 52.

In addition, the hatch cover 52 has a size that is larger than that of the opening 28 of the structural liner 20. The technical face 56 thus completely covers the opening 28, which makes it possible to hide a cut-out which may not be sufficiently precise, which makes it possible to confer to the assembly of the structural liner 20 and the hatch cover 52 a satisfactorily aesthetic appearance.

The invention also relates to a structural liner 20 assembled with the hatch cover described above. This assembly is illustrated in FIG. 5b.

We will now describe the method of replacing the technical element according to the first embodiment of the invention. This method is the same as that described above, in which the step of cutting out is performed all along the closed contour traveled by the groove 23. Thus, the hatch 50 is completely removed from the structural liner 20.

Then, the steps of replacing the technical element 40 and closing the opening 28 are accomplished by clipping the hatch cover 52, which is a hatch that is not derived from the cut-out of the structural liner 20, into the opening 28 of the liner 20.

This method is particularly advantageous because it makes it possible to very quickly replace a defective technical element 40 with a new one, by adding a hatch cover 52 onto which a new technical element 40 is already fastened. In addition, since the opening 28 is completely covered by the hatch cover 52, thus hidden, the cut-out thereof does not require great accuracy.

Alternatively, when the access hatch 50 does not comprise any technical element 40 (which is fastened on the outer face 22, outside the access hatch 50), the step of replacing the same is carried out after removal of the access hatch 50, and before replacing it by the replacement hatch 52.

Figure 6:
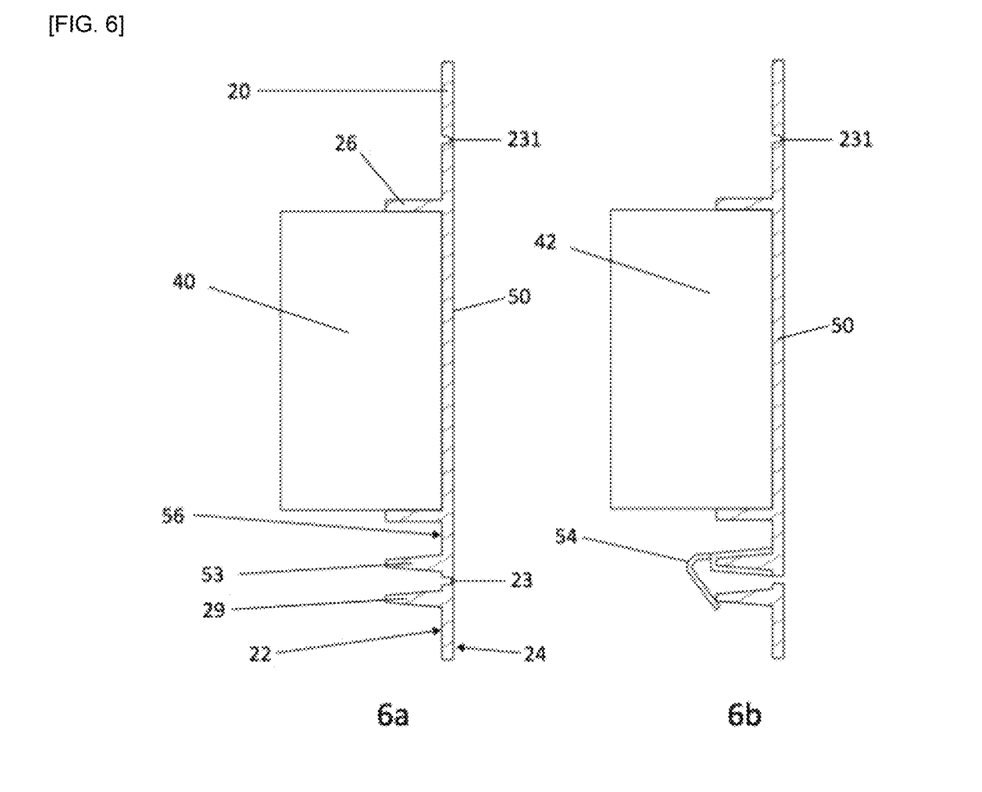

We will now describe a second embodiment of the invention using FIGS. 6a and 6b, which show a cross-section of the structural liner 20 along the plane B-B of FIG. 4, before and after replacement of the technical element.

The structural liner 20 according to this embodiment is similar to that shown at the beginning of the detailed description, except for the elements described below.

Figure 8:
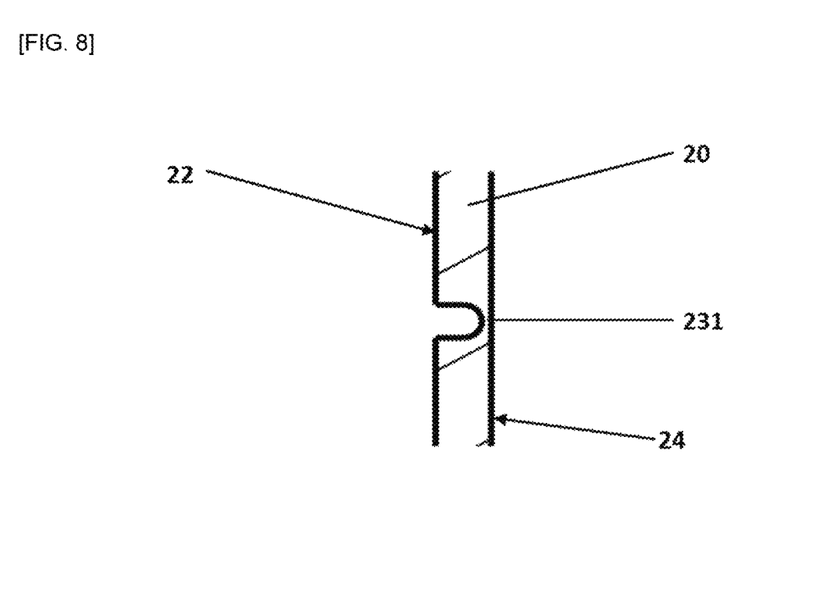
FIG. 8 is a partial section of a structural liner according to one embodiment of the invention.
Figure 9:
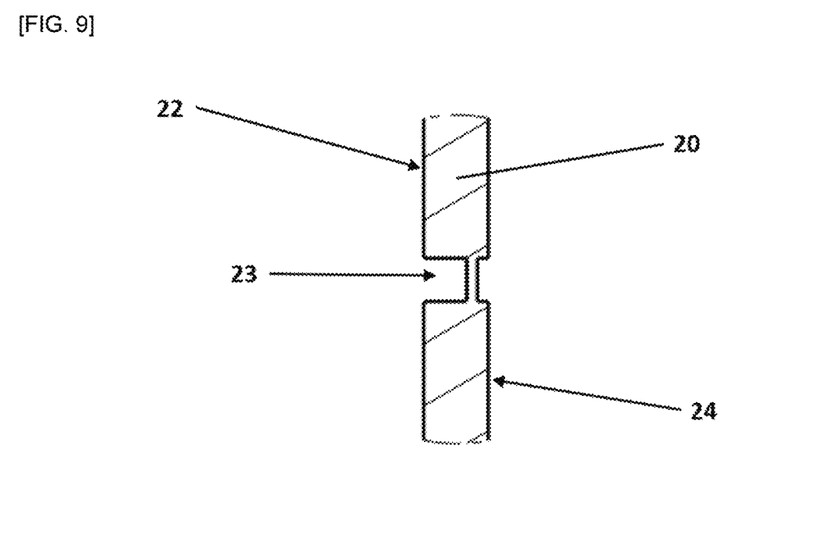
FIG. 9 is a partial section of a structural liner according to an embodiment of the invention.

In this structural liner 20, part of the groove 23 constitutes a film hinge 231. When the remainder of the groove has been cut out, except at the location of the hinge (for example by cutting out three of four sides of the path of the groove 23, with the fourth side of the groove 23 being of reduced thickness and forming the film hinge 231), the film hinge allows the rotation of the hatch around it, due to the flexibility of the film hinge 231, along an axis of rotation defined by the film 231. FIG. 9 shows a cross-sectional view of the groove 23 and the film hinge 231 is shown in cross-section in FIG. 8.

In this example, the groove 23 delineates a rectangle-shaped contour around the technical element 40, of which the film hinge 231 forms part or all of one of the sides.

The fastening means 53 of the hatch 50 is located facing the retaining means located outside the closed contour 29. Thus, it is in a position that is suitable to maintain the hatch in a closed position, once the cut-out and the replacement of the technical element 40 have been performed.

The fastening means 53 of the hatch 50 is able to receive a clasp 54. This clasp is fastened to the closure means 53, for example for example by clamping, clipping or crimping, once the replacement hatch 52 is installed, after the hatch 50 has been cut out. This clasp 54 is able to cooperate with the retaining means 29 located outside the contour delineated by the groove 23. Thus, when the hatch 50 is closed, the clasp 54 fixes it in the closed position in the opening 28 of the structural liner 20. Thus, the addition of a clasp on the retaining means 29, 53 is a simple, reliable and inexpensive technical solution for keeping the hatch 50 in the closed position once the technical element 40 replaced.

We will now describe the method of replacing the technical element 40 according to the second embodiment of the invention. The method according to this embodiment is similar to that presented at the beginning of the detailed description, with the exception of the elements described below.

The step of cutting out the access hatch 50 leaves the part of the groove 23 intact, forming the film hinge 231 of the structural liner 20. Thus, the hatch 50 is free to pivot around the film 231.

Thus, the step of clearing the hatch 50 is not to remove the hatch 50 from the structural liner 20, but to pivot it around the film hinge 231, thanks to its flexibility.

Then, since the hatch 50 is not removed, the technical element 40 is replaced by a replacement technical element 42 directly onto the hatch 50, which is still secured to the structural liner 20. Alternatively, when the technical element 40 is fastened on the outer face 22 and not on the access hatch 50, the cut-out and pivoting of the access hatch 50 allows access to the technical element 40 and its replacement on the outer face 22.

Lastly, the step of closing the opening 28 is performed by folding down the access hatch 50 into the opening 28. Thus, when the access hatch 50 closes the opening 28, the retaining means 29 located outside the closed contour, and the attachment means 53 of the access hatch 50 cooperate to maintain the access hatch 50 closed.

More particularly, when a clasp 54 has been installed on the fastening means 53 of the hatch 50, just before or after the step of replacing the technical element 40 on the hatch 50, the latter uses the closing means outside of the closed contour 29 once the closing step of the hatch has been carried out, which effectively keeps the hatch 50 in the closed position.

The method of replacing the technical element 40 is particularly advantageous because it is a simple way to replace the technical element, without the need to connect a new hatch cover.

Figure 7:
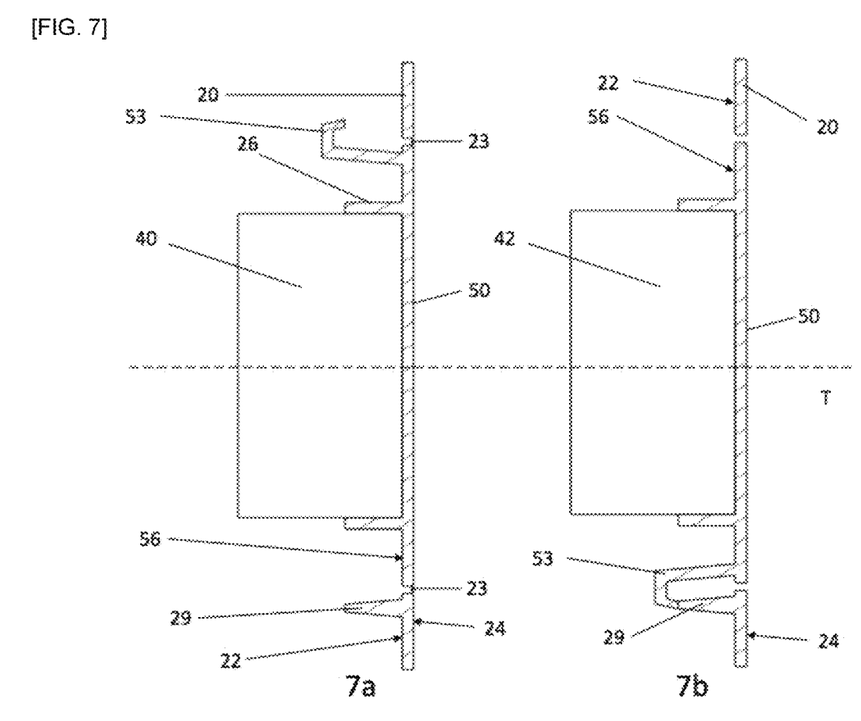

We will now describe a third embodiment of the invention, using FIGS. 7a and 7b, which show a section of the structural liner 20 along the plane B-B of FIG. 4, before and after replacement of the technical element.

The structural liner 20 according to the third embodiment of the invention comprises fastening means 53 of the replacement hatch 50 which are located facing the retaining means 29 of the liner 20 located outside the closed contour when the replacement hatch 50 rotates 180 degrees about an axis of rotation T normal to the outer face 22 of the liner 20. The angle of rotation can take on several values depending on the shape of the access hatch 50. In the case illustrated here, with a rectangular-shaped access hatch 50, this rotation is 180 degrees. One could very well have a rotation of 90 degrees in the case of a square-shaped trap door 50. An angle of rotation of 120 degrees is also possible in the case of a triangular-shaped access hatch 50. One could also have any angle of rotation in the case of a disk-shaped access hatch 50.

Thus, in the initial position of the access hatch 50, that is to say before the cut-out thereof, the retaining means 29 and the fastening means 53 are not facing each other. They cannot cooperate to prevent the removal of the hatch 50. Before replacing the hatch 50 into the opening 28, it is rotated as previously described, which has the effect of putting the fastening means of the door 52 facing the retaining means 29 located outside the closed contour. Thus, in this position, the hatch 52 is fastened to the opening 28 of the structural liner 20.

We will now describe the method of replacing the technical element 40 according to the third embodiment of the invention. The method according to this embodiment is similar to that presented at the beginning of the detailed description, with the exception of the elements described below.

The step of clearing the hatch is carried out by complete removal and separation of the hatch 50 from the structural liner 20.

The step of replacing the technical element is done directly on the hatch 50. The previously removed hatch 50 is thus reused to plug the opening 28 made in the structural liner 20 by the cut-out.

As for the other embodiments, the technical element 40 is not necessarily located on the access hatch 50, and can be located on the outer face 22 outside the hatch 50. In this case, the removal of the hatch 50 allows access to the technical element and its replacement.

Lastly, the closing step is performed by again placing the cut-out hatch into the opening of the structural liner 20. Nevertheless, the hatch 50 is rotated 180 degrees around the normal axis T to the first surface 22 of the structural liner 20, prior to the replacement of the hatch 50 into the opening 28.

This method is particularly advantageous because it enables the replacement of the technical element 40 without additionally needing to use a replacement hatch 52. In addition, it does not require the addition of additional holding means on the access door 50 before newly placing it into the opening 50. This method therefore represents a quick and inexpensive way to replace a defective technical element placed between the structural liner 20 and the outer skin 30 of a tailgate 10.

The invention is not limited to the embodiments presented here and other embodiments will become clearly apparent to a person skilled in the art.

NOMENCLATURE

10: rear hatchback of a motor vehicle
20: structural liner of the hatchback
22: outer face of the structural liner
23: groove
231: film hinge
24: inner side of the structural liner
26: technical element fastening means
28: opening in the structural liner
29: retaining means
30: visible hatchback skin
40: technical element
42: replacement technical element
50: access hatch
52: replacement hatch
53: means of fastening the hatch
54: clasp
56: technical face of the hatch
58: clip
60: hollow body

The invention claimed is:

1. A structural liner made of plastic for a hatchback of a motor vehicle, comprising an outer face oriented towards the outside of the vehicle and an inner face oriented towards the inside of the vehicle when the hatchback is assembled thereon, and at least one groove on one of the two faces, wherein the groove forms a zone of mechanical weakness that facilitates forming an opening delineating an access hatch in the structural liner.

2. The structural liner according to claim 1, wherein the outer face comprises fastening means of technical elements located inside the closed contour defining the access hatch.

3. The structural liner according to claim 1, wherein the outer face comprises at least one retaining means arranged near the groove outside of the closed contour.

4. The structural liner according to claim 3 wherein the access hatch comprises at least one fastening means.

5. The structural liner according to claim 4, wherein the fastening means of the access hatch is located facing the retaining means arranged near the groove outside closed contour.

6. The structural liner according to claim 5, wherein a portion of the groove constitutes a film hinge allowing rotation of the hatch when the opening of the structural liner has been made.

7. The structural liner according to claim 6, wherein the fastening means of the access hatch is able to receive a clasp suitable to cooperate with the retaining means arranged near the groove outside of the closed contour.

8. The structural liner according to claim 4 wherein the fastening means of the access hatch is facing the retaining means arranged near the groove outside the closed contour when the access hatch rotates about an axis normal to the outer face.

9. A replacement hatch for an opening of a structural liner for a hatchback of a motor vehicle, characterized in that it comprises at least one clip suitable to cooperate with a retaining means arranged near an opening of the structural liner.

10. The replacement hatch according to claim 9, which comprises a technical face intended to be hidden when the replacement hatch is mounted on the opening of the structural liner, the technical side having at least one technical element fastening means.

11. The replacement hatch according to claim 10, which has a size that is larger than that of the opening of the structural liner for which the replacement hatch is intended.

12. The structural liner with a replacement hatch according to claim 9, wherein the replacement hatch is secured to the structural liner by clamping edges of the opening of the structural liner between the technical face of the replacement hatch and the clip of the replacement hatch.

13. The plastic hatchback of a motor vehicle comprising a structural liner according to claim 9.

14. A method of replacing a technical element fastened to a structural liner of a motor vehicle hatchback comprising the steps of:
- cut-out of an access hatch in the structural liner of the hatchback following a groove of the structural liner;
- clearing of an opening in the structural liner left by the cut-out of the access hatch;
- replacing the technical element with a replacement technical element; and
- closing the opening.

15. The replacement method according to claim 14, wherein the opening is closed by clipping on a replacement hatch.

16. The replacement method of claim 14 wherein:
- the step of cutting out the access hatch leaves a portion of the groove intact, forming a film hinge of the structural liner;
- the step of clearing the access hatch is executed by rotation of the door around the film hinge;
- the closing step is performed by folding down the access hatch into the opening.

17. The replacement method of claim 14 wherein:
- the step of clearing the access hatch is executed by completely removing it;
- the closing step is carried out by replacing the access hatch into the opening, by rotating around an axis thereof, preferably a rotation of 180 degrees around the axis.

* * * * *